(12) United States Patent
Ugarov

(10) Patent No.: US 10,663,430 B2
(45) Date of Patent: May 26, 2020

(54) QUANTITATION THROUGHPUT ENHANCEMENT BY DIFFERENTIAL MOBILITY BASED PRE-SEPARATION

(71) Applicant: Thermo Finnigan LLC, San Jose, CA (US)

(72) Inventor: Mikhail V. Ugarov, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 16/058,892

(22) Filed: Aug. 8, 2018

(65) Prior Publication Data
US 2020/0051805 A1    Feb. 13, 2020

(51) Int. Cl.
*G01N 27/62* (2006.01)
*H01J 49/06* (2006.01)
*H01J 49/42* (2006.01)

(52) U.S. Cl.
CPC ......... *G01N 27/624* (2013.01); *G01N 27/622* (2013.01); *H01J 49/063* (2013.01); *H01J 49/067* (2013.01); *H01J 49/4265* (2013.01)

(58) Field of Classification Search
CPC .. H01J 49/4295; H01J 49/009; H01J 49/0031; H01J 49/427; G01N 27/622; G01N 27/624
See application file for complete search history.

(56) References Cited

U.S. PATENT DOCUMENTS

| 5,455,417 A | 10/1995 | Sacristan |
| 5,847,386 A | 12/1998 | Thomson et al. |
| 5,936,242 A | 8/1999 | De La Mora et al. |

(Continued)

FOREIGN PATENT DOCUMENTS

| EP | 2126960 A2 | 12/2009 |
| EP | 3142141 A1 | 3/2017 |

(Continued)

OTHER PUBLICATIONS

Loboda et al., "Novel Linac II electrode geometry for creating an axialfield in a multipole ion guide", European Journal of Mass Spectrometry, IM Publications 2000, vol. 6 (6), pp. 531-536.

(Continued)

*Primary Examiner* — Wyatt A Stoffa
(74) *Attorney, Agent, or Firm* — David A. Schell

(57) ABSTRACT

A system for analyzing a sample includes a source configured to generate ions from constituent components of the sample; a mobility separator configured to separate ions received from the source based on the mobility in a gas; a plurality of ion channels arranged adjacent to the plurality of exit apertures of the mobility separator such that ions from the mobility separator are directed to different channels according to their respective mobility; a mass analyzer configured to determine the mass-to-charge ratio of the ions; and a controller. The controller is configured to identify retention time windows with minimum overlap of ions with similar mobility and sets of ions within the retention time windows; adjust mobility separation parameters for specific sets of ions to optimize separation of compounds; and quantify a plurality of target analytes.

22 Claims, 15 Drawing Sheets

(56) References Cited

U.S. PATENT DOCUMENTS

| | | | |
|---|---|---|---|
| 7,196,327 B2* | 3/2007 | Thomson | H01J 49/025 250/281 |
| 7,626,161 B2 | 12/2009 | Labowsky et al. | |
| 7,858,927 B2 | 12/2010 | Thomson | |
| 8,384,025 B2 | 2/2013 | Sun et al. | |
| 8,581,177 B2* | 11/2013 | Kovtoun | H01J 49/06 250/281 |
| 8,692,189 B2* | 4/2014 | Makarov | H01J 49/425 250/283 |
| 8,766,176 B2 | 7/2014 | Park et al. | |
| 9,285,343 B2* | 3/2016 | Wu | G01N 27/624 |
| 9,293,316 B2* | 3/2016 | Kovtoun | H01J 49/4295 |
| 9,508,538 B2* | 11/2016 | Kovtoun | H01J 49/0045 |
| 9,607,817 B1* | 3/2017 | Ugarov | H01J 49/0031 |
| 9,646,814 B2 | 5/2017 | Brown et al. | |
| 9,812,310 B2* | 11/2017 | Kovtoun | H01J 49/4295 |
| 2003/0146377 A1 | 8/2003 | Miller et al. | |
| 2005/0029449 A1 | 2/2005 | Miller et al. | |
| 2007/0272852 A1 | 11/2007 | Miller et al. | |
| 2008/0067349 A1* | 3/2008 | Moskovets | H01J 49/009 250/287 |
| 2009/0140140 A1* | 6/2009 | Raznikov | G01N 27/622 250/287 |
| 2011/0001044 A1 | 1/2011 | Chou | |
| 2011/0183431 A1 | 7/2011 | Covey et al. | |
| 2012/0256083 A1* | 10/2012 | Kovtoun | H01J 49/06 250/282 |
| 2012/0325024 A1 | 12/2012 | Vidal-De-Miguel et al. | |
| 2014/0326870 A1 | 11/2014 | Makarov | |
| 2014/0346339 A1 | 11/2014 | Wu et al. | |
| 2015/0287585 A1* | 10/2015 | Kovtoun | H01J 49/4295 250/283 |
| 2017/0076928 A1* | 3/2017 | Ugarov | H01J 49/0031 |
| 2017/0200594 A1 | 7/2017 | Giles et al. | |
| 2019/0137447 A1 | 5/2019 | Campbell | |

FOREIGN PATENT DOCUMENTS

| | | |
|---|---|---|
| EP | 3214638 A1 | 9/2017 |
| EP | 3239705 B1 | 9/2018 |
| GB | 2525275 A | 10/2015 |
| WO | 2004/012231 A2 | 2/2004 |
| WO | 2005/065307 A2 | 7/2005 |
| WO | 2006/130474 A2 | 12/2006 |
| WO | 2008/094704 A2 | 8/2008 |

OTHER PUBLICATIONS

Rus, et al., "IMS—MS studies based on coupling a differential mobility analyzer (DMA) to commercial API—MS systems", Int. J.Mass.Spectrom., 2010, vol. 298 (1-3), pp. 30-40.

Cumeras et al., "Review on Ion Mobility Spectrometry. Part 1: current instrumentation", Analyst 2015, 140 (5), pp. 1376-1390.

Kanu et al., "Ion mobility-mass spectrometry", J. Mass Soectrom. 2008, 43 (1), pp. 1-22.

Oller-Moreno et al., "Sliding window multi-curve resolution: Application to gas chromatography—ion mobility spectrometry", Sensors and Actuators B 217 (2015), pp. 13-21.

Shvartsburg, "Ion Mobility Spectrometry (IMS) and Mass Spectrometry (MS)", Encyclopedia of Spectroscopy and Spectrometry, 2017, pp. 314-321.

* cited by examiner

QUANTITATION THROUGHPUT ENHANCEMENT BY DIFFERENTIAL MOBILITY BASED PRE-SEPARATION

FIELD

The present disclosure generally relates to the field of mass spectrometry including systems and methods for quantitation throughput enhancement by differential mobility based pre-separation.

INTRODUCTION

While generally preferred for quantitation of multiple co-eluting analytes, filtering type mass spectrometry devices, such as quadrupole mass spectrometers, suffer from reduced efficiency (duty cycle) because they transmit ions of a single m/z ratio at a time while the rest are wasted. When performing an analysis of a complex sample, multiple analytes (N) can be targeted simultaneously by switching between ions and the duty cycle is limited to 1/N. While improvements can be made by only targeting transitions that correspond to ions eluting at a given moment, scheduling such experiments can be difficult when multiple ions elute at the same time or when retention times are unpredictable. Accumulating a broad range of ions in a trap and selectively ejecting them based on m/z to a quadrupole has the potential to avoid losing or missing ions while the quadrupole is analyzing only one m/z target at a time. However, the capacity of mass resolving ion traps is limited to between about $10^7$ to about $10^9$ ions per second, which is significantly below the brightness of existing ion sources, which can generate about $10^{10}$ ions per second or more. As such, the potential gains would be negated by the inability to handle the entire load as compared to a normal flow-through regime with the quadrupole cycling between m/z ratios. Other approaches for ion accumulation can make use of ion mobility principles where ions are separated in time/space by differences in their collision cross sections. These techniques can suffer from similar space charge capacity limitations as the entire population of ions is expected to be confined to a small space before being injected into the mass spectrometer for subsequent analysis.

From the foregoing it will be appreciated that a need exists for improved systems and methods for quantitative analysis of a sample.

SUMMARY

In a first aspect, a system for analyzing a sample can include a source configured to generate ions from constituent components of the sample; a mobility separator configured to separate ions received from the source based on the mobility in a gas; a plurality of ion channels arranged adjacent to the plurality of exit apertures of the mobility separator such that ions from the mobility separator are directed to different channels according to their respective mobility; a mass analyzer configured to determine the mass-to-charge ratio of the ions; and a controller. The controller can be configured to identify retention time windows with minimum overlap of ions with similar mobility and sets of ions within the retention time windows; adjust mobility separation parameters for specific sets of ions to optimize separation of compounds; and quantify a plurality of target analytes.

In various embodiments of the first aspect, the controller can be further configured to select an optimum accumulation times based on a population of sets of ions for a retention time window.

In various embodiments of the first aspect, the controller can be further configured calibrate the mobility of a plurality of the target analytes;

In various embodiments of the first aspect, a lens array can be positioned between the mobility separator and the plurality of ion channels, the lens array can be configured to guide ions into respective ion channels.

In various embodiments of the first aspect, the controller can be configured to determine the number of sets of ions based on a number of overlapping compounds.

In various embodiments of the first aspect, the controller can be further configured to determine the number of sets of ions based on a number of overlapping compounds and a number of different products.

In various embodiments of the first aspect, the mobility separator can include a first wall, a second wall, a passage between the first and second wall, and having a gas flow in a first direction and an electric field such that ion paths of the ions from a ion entrance to a plurality of ion exit apertures are governed by the electric field and the gas flow. In particular embodiments, the controller can be configured to adjust mobility separation parameters by adjusting a gas flow rate, adjusting the electric field, or any combination thereof.

In various embodiments of the first aspect, the controller can be further configured to adjust a trapping time, an acquisition time, or a combination thereof to optimize sensitivity for the number of sets of ions.

In various embodiments of the first aspect, a transmission of ions through the mobility separator for a first set of ions can be greater than a transmission of ions through the mobility separator for a second set of ions.

In various embodiments of the first aspect, a separation of ions through the mobility separator for a first set of ions can be greater than a separation of ions through the mobility separator for a second set of ions.

In a second aspect, a method for analyzing components of a sample can include identify retention time windows with minimum overlap of ions with similar mobility and sets of ions within the retention time windows; determining mobility separation parameters for the sets of ions to optimize separation of compounds; providing a sample to an ion source and generating a plurality of ions from constituent components of the sample; separating a first set of ions of the plurality of ions based on ion mobility using a ion mobility separator using parameters for the first set of ions; directing the ions into a plurality of ion channels such that ions entering an individual ion channel have a range of ion mobilities that is different from a range of ion mobilities for ions entering an adjacent ion channel; analyzing ions from the first set of ions from individual ion channels in a mass analyzer; adjusting the ion mobility separator using parameters for a second set of ions; separating a second set of ions of the plurality of ions based on ion mobility using the mobility separator; directing the ions into the plurality of ion channels; analyzing ions of the second set of ions from individual ion channels in the mass analyzer; and determining the mass-to-charge ratio and quantifying ions of the first and second sets of ions using the mass analyzer.

In various embodiments of the second aspect, the first ion set can be within a first retention time window and the second ion set can be within a second retention time window.

In various embodiments of the second aspect, the first ion set and the second ion set can be within a first retention time window.

In various embodiments of the second aspect, selecting an optimum accumulation times for the retention time windows can be based on a population of sets of ions.

In various embodiments of the second aspect, the method can further include fragmenting the ions prior to analyzing in the mass analyzer.

In various embodiments of the second aspect, the method can further include calibrating the mobility of target analytes.

In various embodiments of the second aspect, separating ions using a ion mobility separator the ion mobility separator can include providing a gas flow in a first direction and an electric field such that ion paths of the ions from a ion entrance to a plurality of ion exit apertures are governed by the electric field and the gas flow.

In particular embodiments, adjusting the ion mobility separator can include adjusting the gas flow, adjusting the electric field, or any combination thereof.

In various embodiments of the second aspect, the method can further include adjusting a trapping time and an acquisition sequence timing for the second set of ions.

In various embodiments of the second aspect, a transmission of the first set of ions can be greater than a transmission of the second set of ions.

In various embodiments of the second aspect, a separation of the first set of ions can be greater than a separation of the second set of ions.

DRAWINGS

For a more complete understanding of the principles disclosed herein, and the advantages thereof, reference is now made to the following descriptions taken in conjunction with the accompanying drawings, in which.

Figures 5A, 5B, 5C:
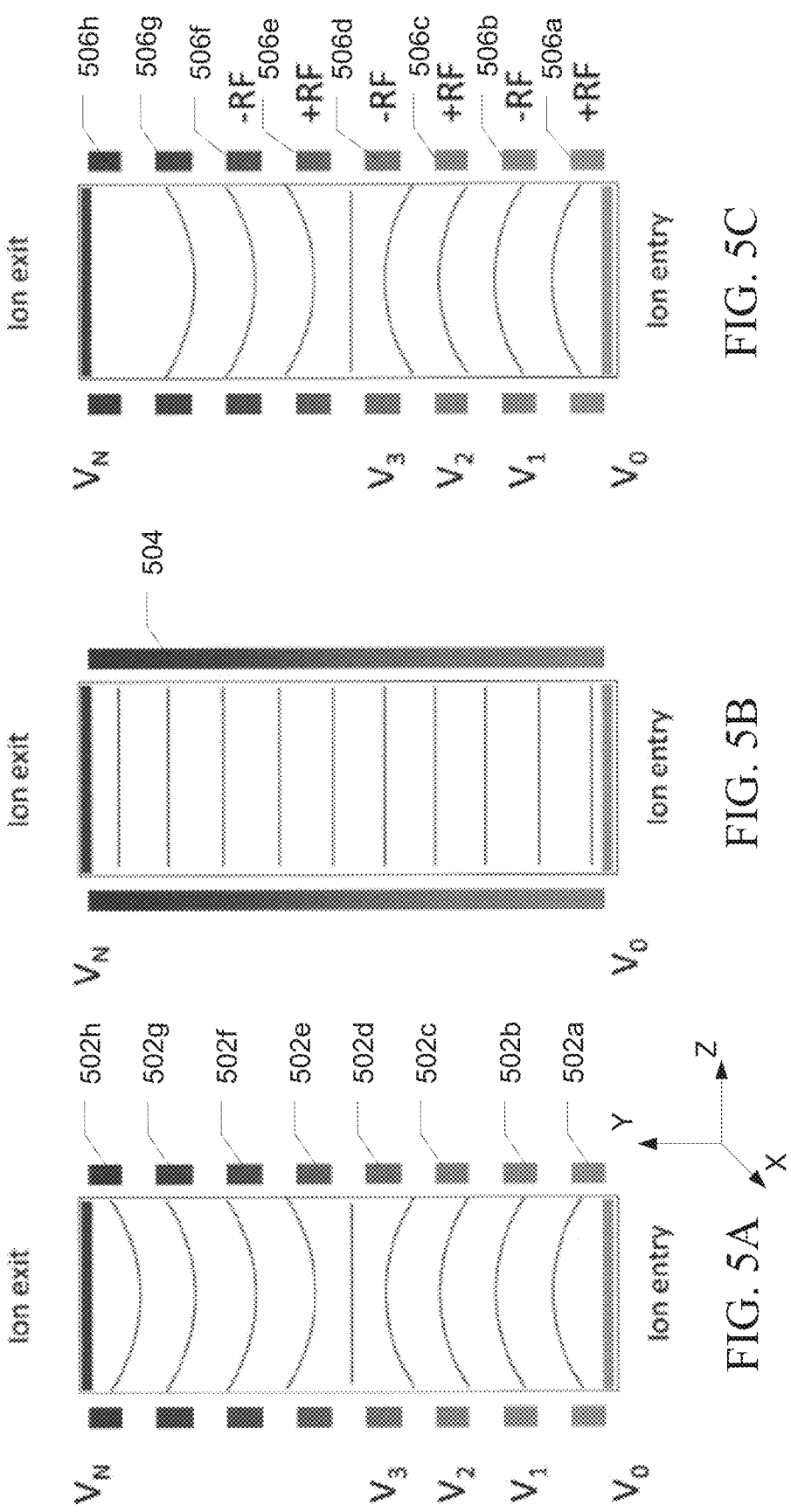

FIGS. 5A, 5B, and 5C are exemplary electrode arrangements for creating an electrical field gradient across an ion mobility separator, in accordance with various embodiments.

Figure 6A:
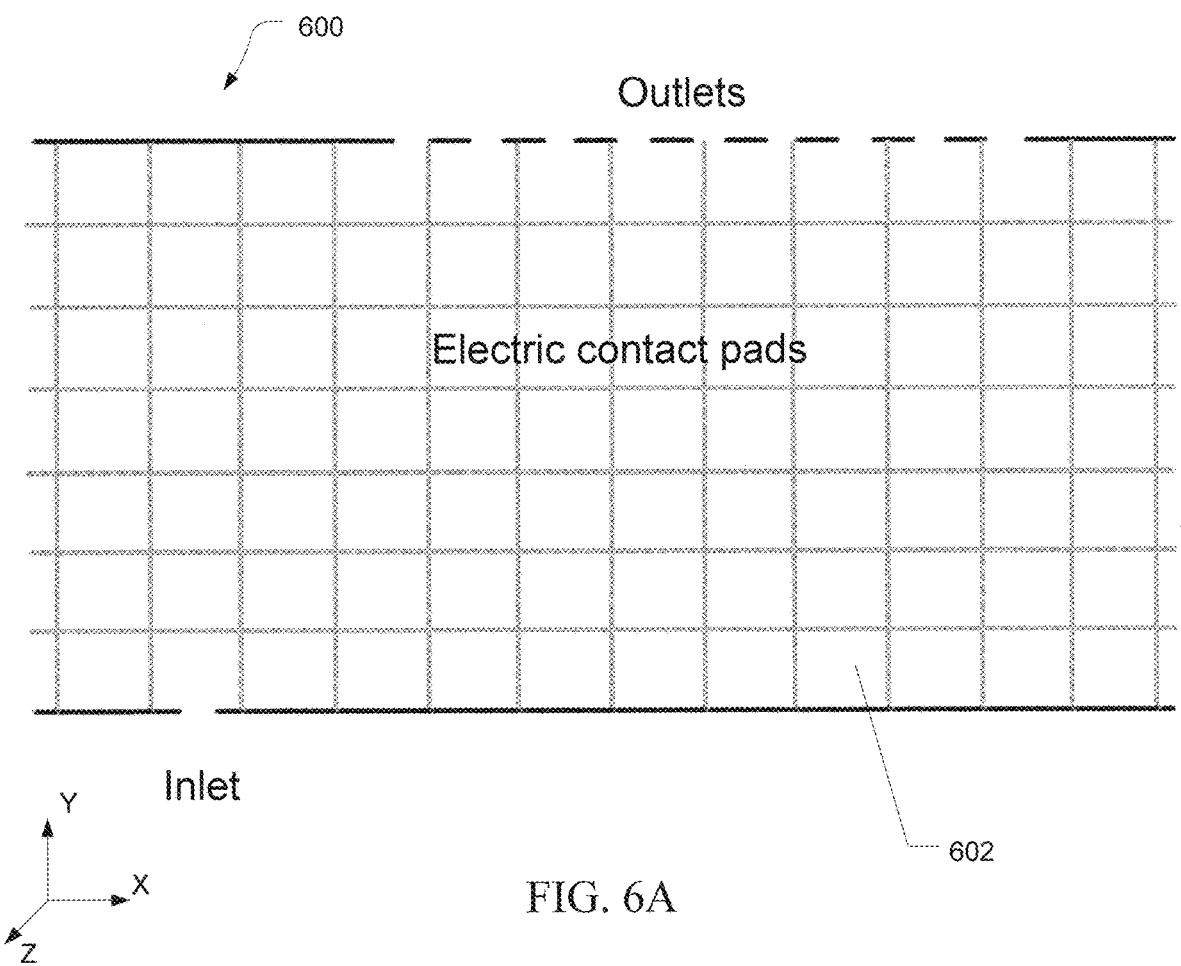

FIG. 6A is an exemplary grid electrode arrangement for creating dynamic electrical field gradients across an ion mobility separator, in accordance with various embodiments.

Figure 6B:
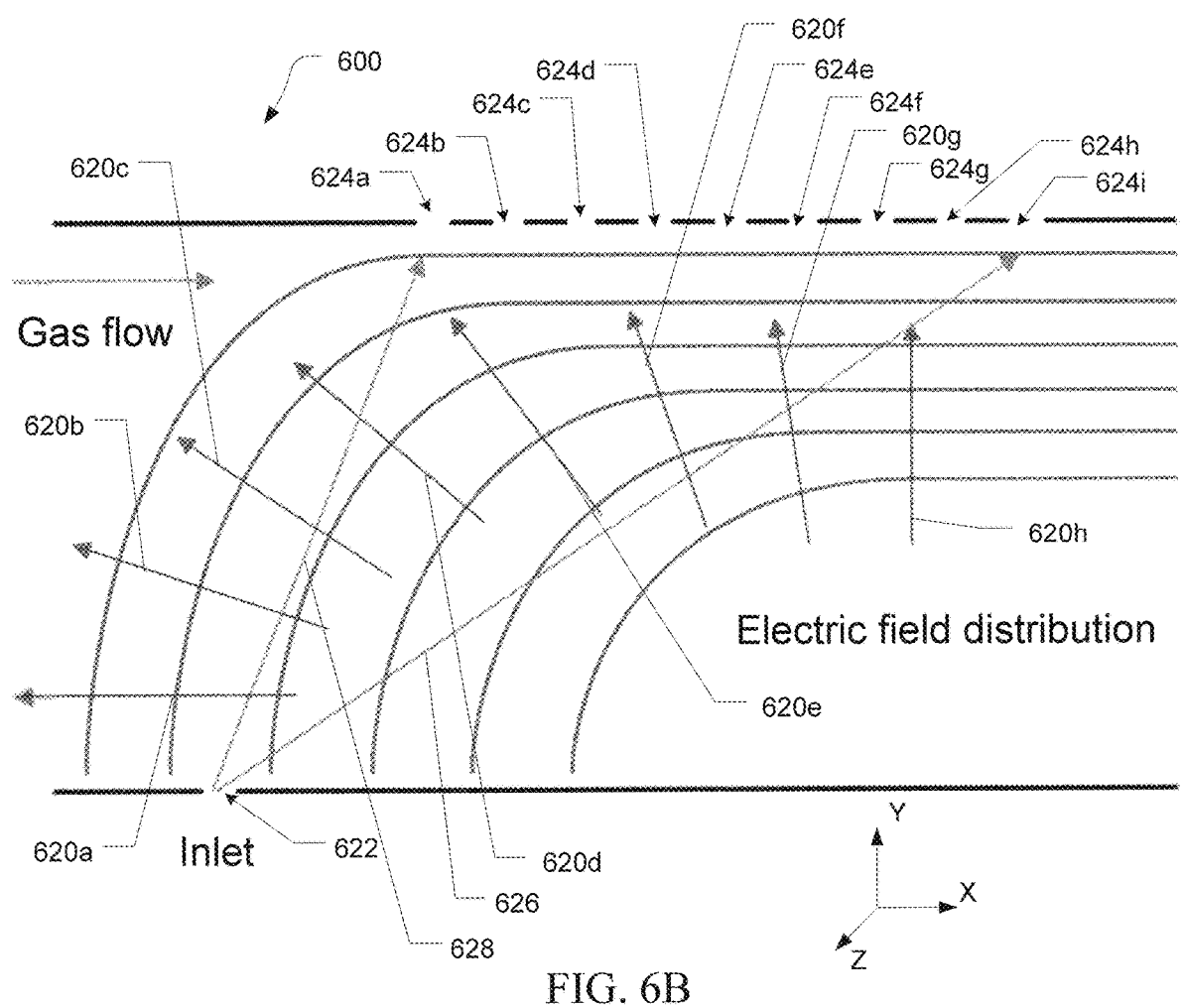

FIG. 6B is an exemplary electric field gradient, in accordance with various embodiments.

FIGS. 7A, 7B, 7C, and 7D are illustrations showing an exemplary ion optical arrangement for guiding ions through ion exit orifices of an ion mobility separator, in accordance with various embodiments.

Figure 8:
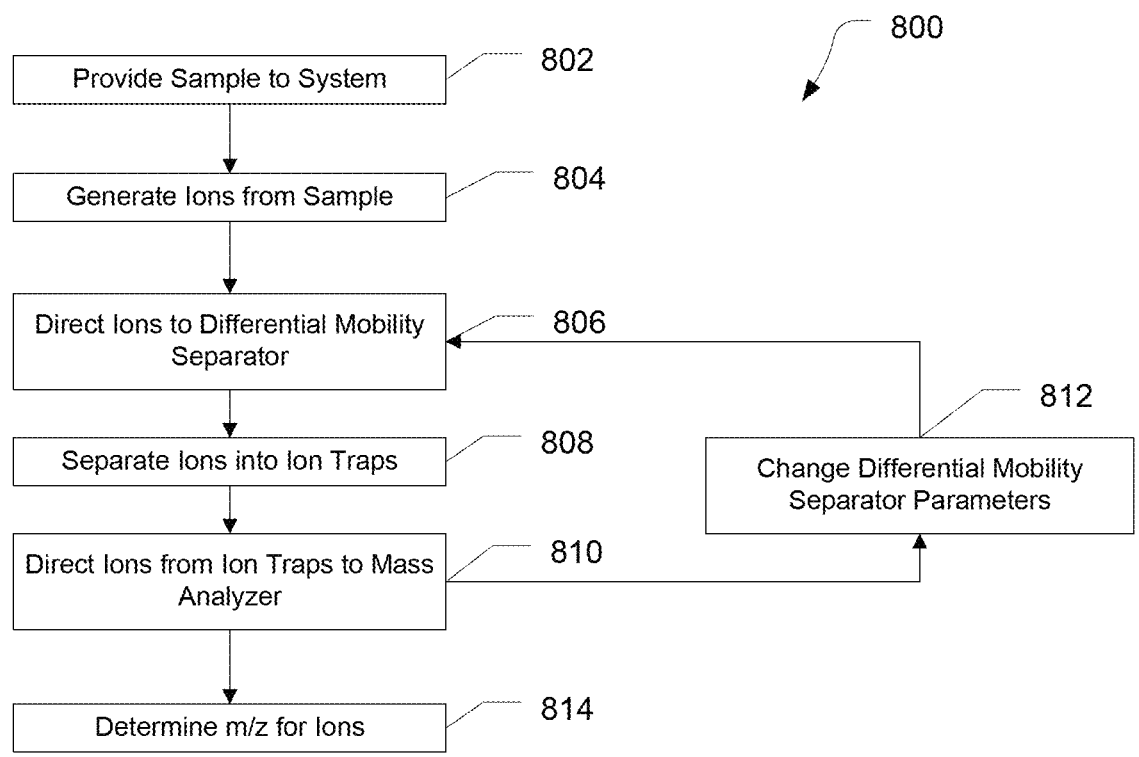

FIG. 8 is a flow diagram illustrating an exemplary method for separating ions, in accordance with various embodiments.

Figure 9A:
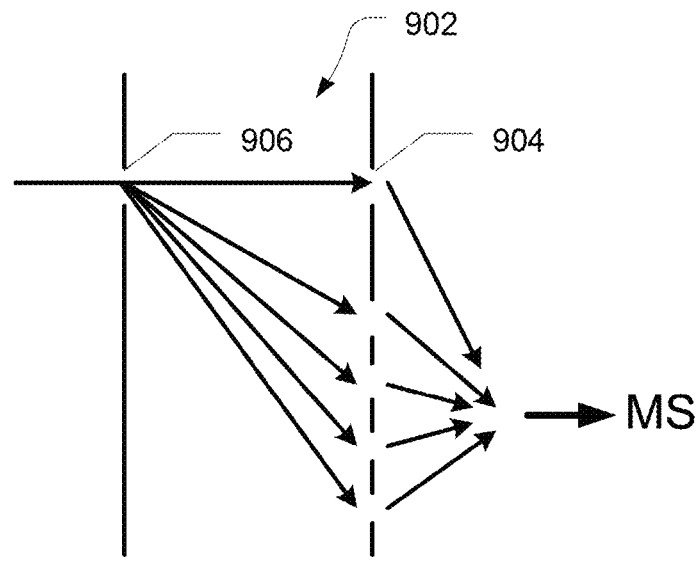
Figure 9B:
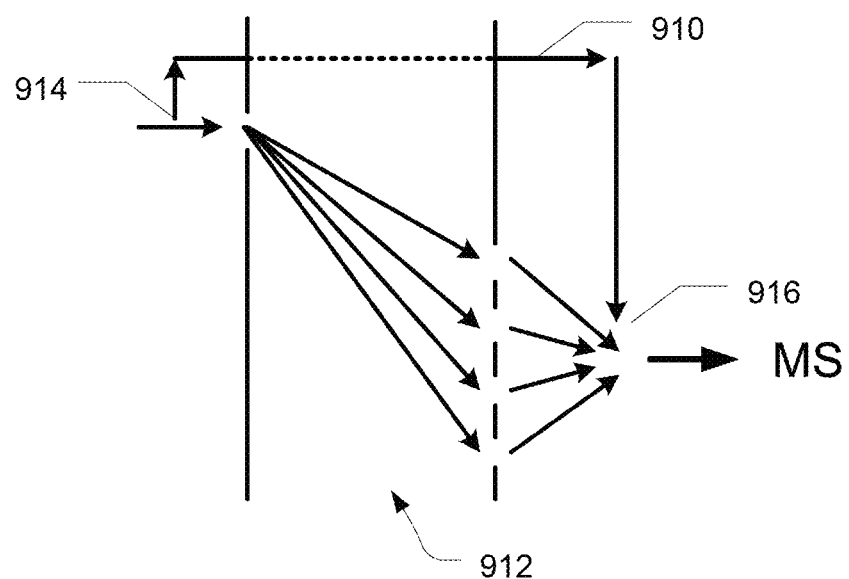

FIGS. 9A and 9B are diagrams illustrating exemplary arrangements for bypassing the ion mobility separator, in accordance with various embodiments.

Figure 10:
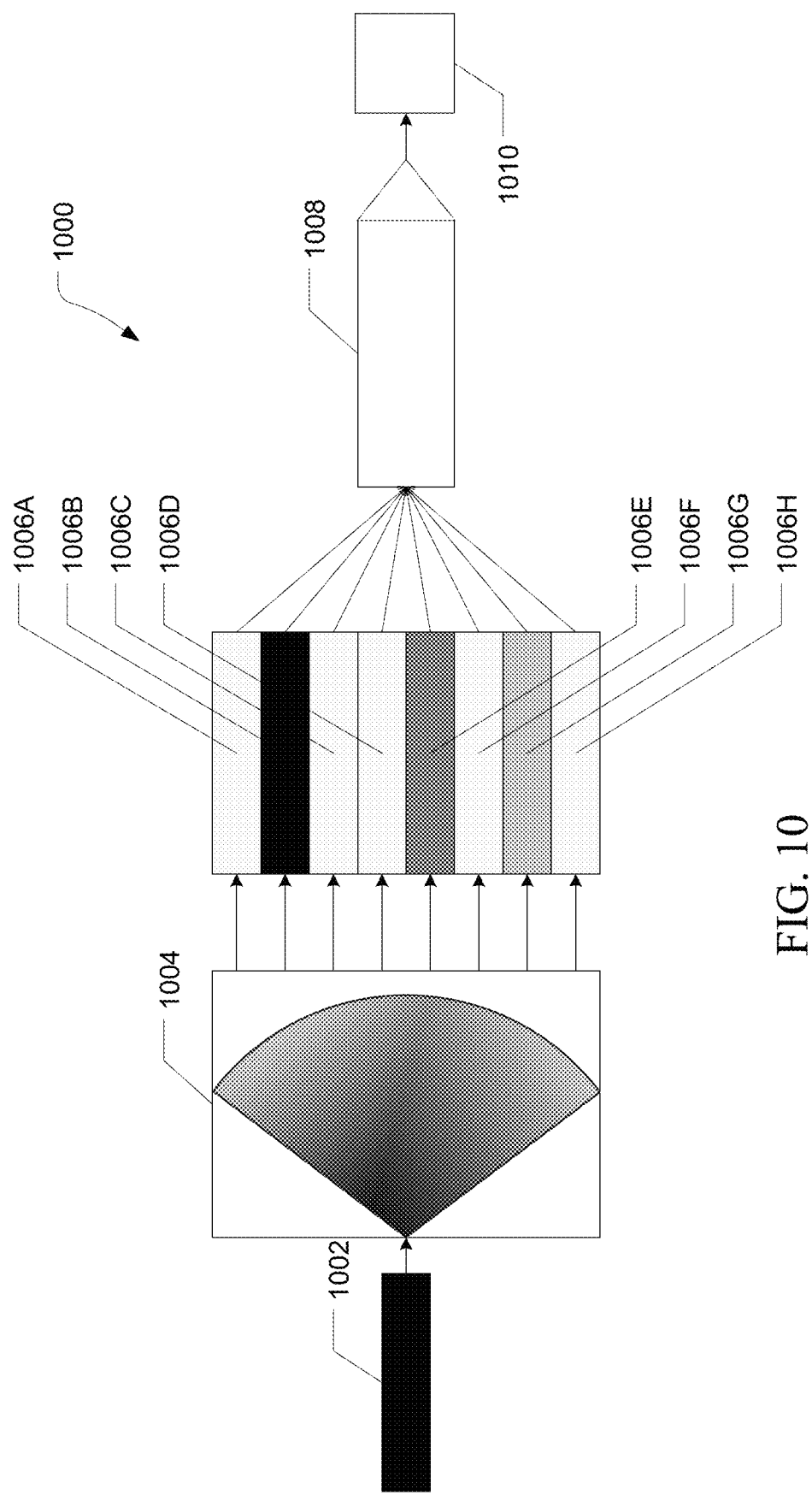

FIG. 10 is a block diagram of an exemplary mass spectrometry system, in accordance with various embodiments.

Figure 11A:
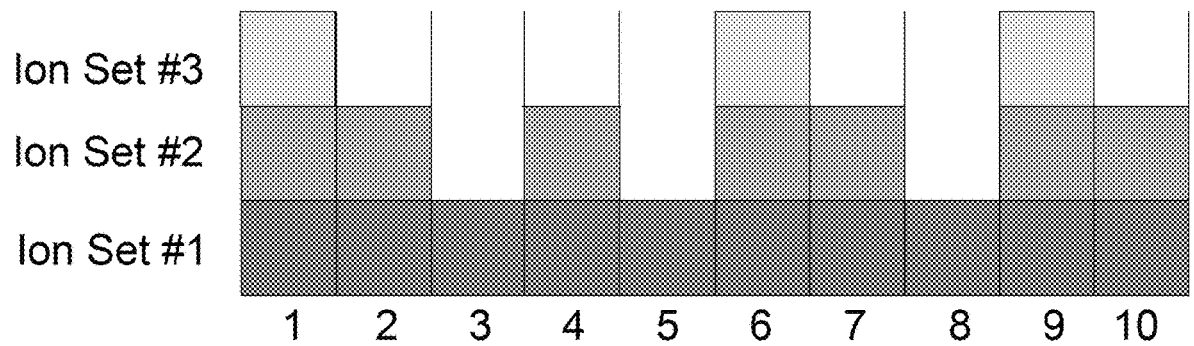
Figure 11B:
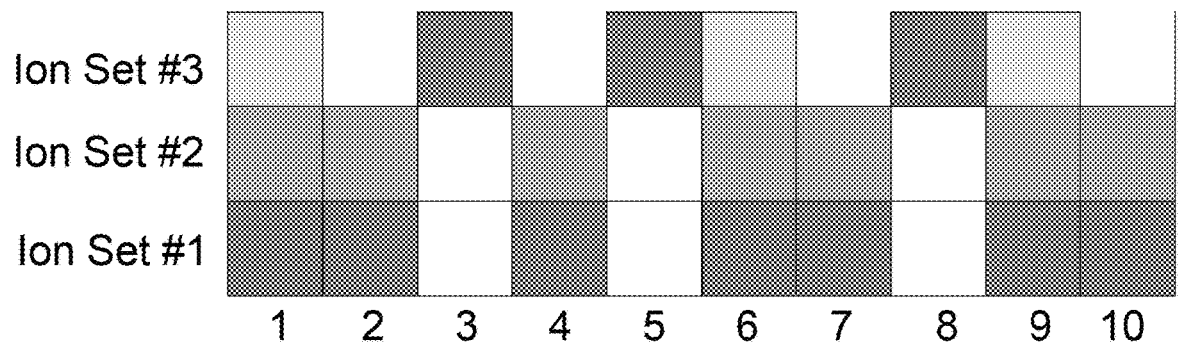
Figure 11C:
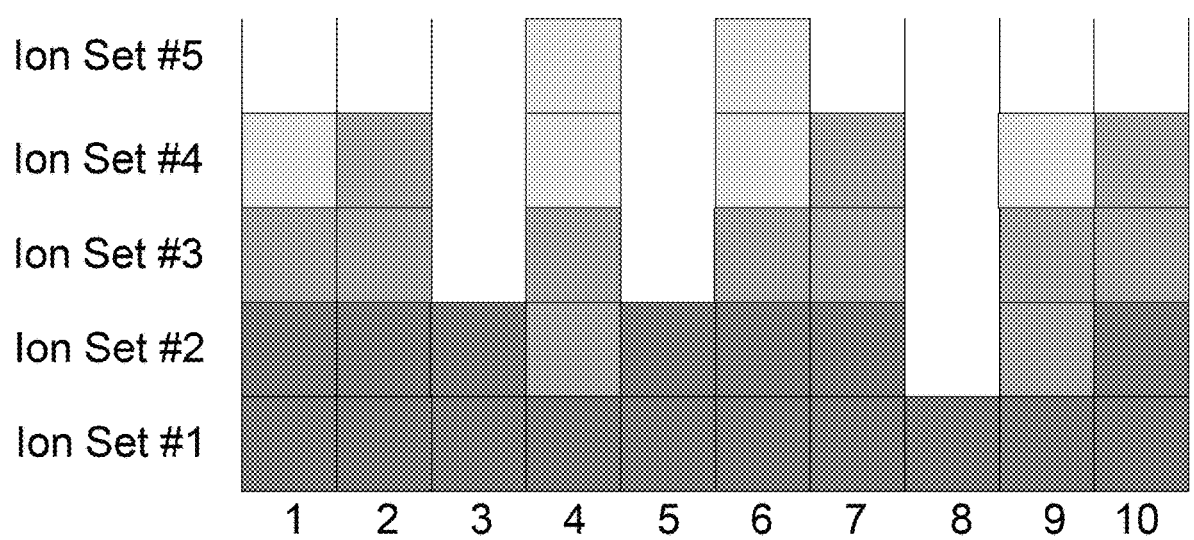

FIGS. 11A, 11B, and 11C are diagrams illustrating the sequencing of ion analysis, in accordance with various embodiments.

Figure 12:
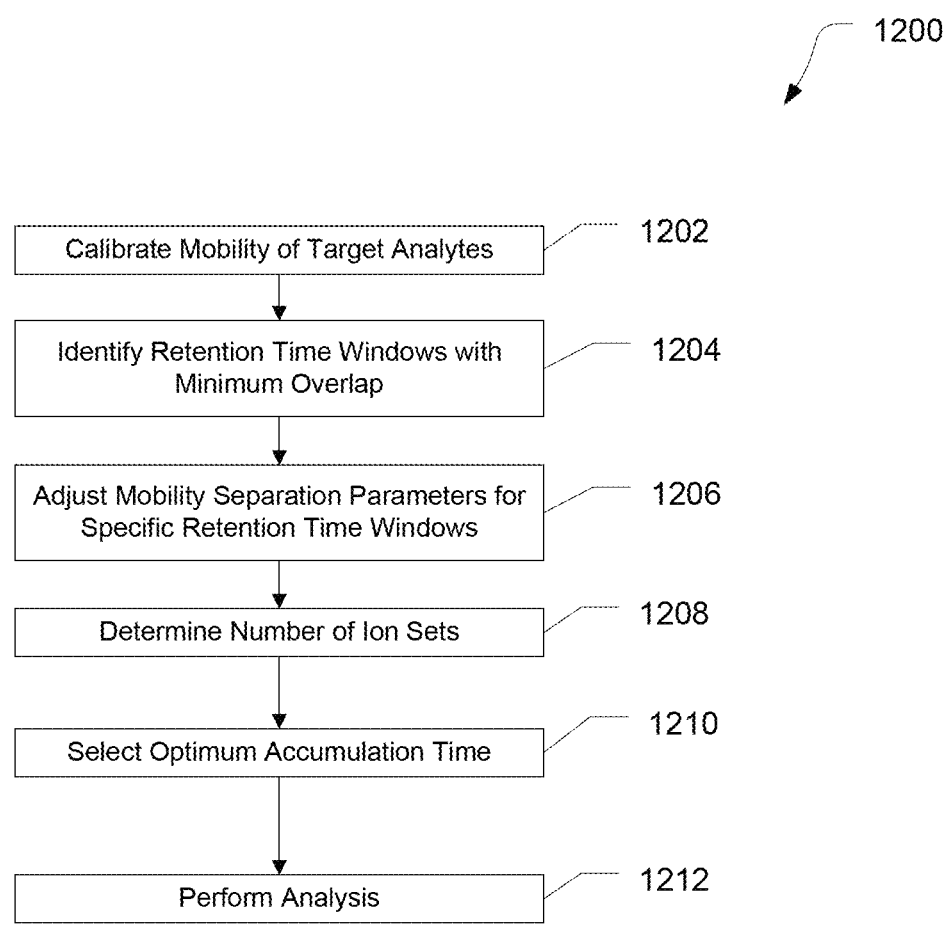

FIG. 12 is a flow diagram illustrating an exemplary method for analyzing a sample, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Figure 1:
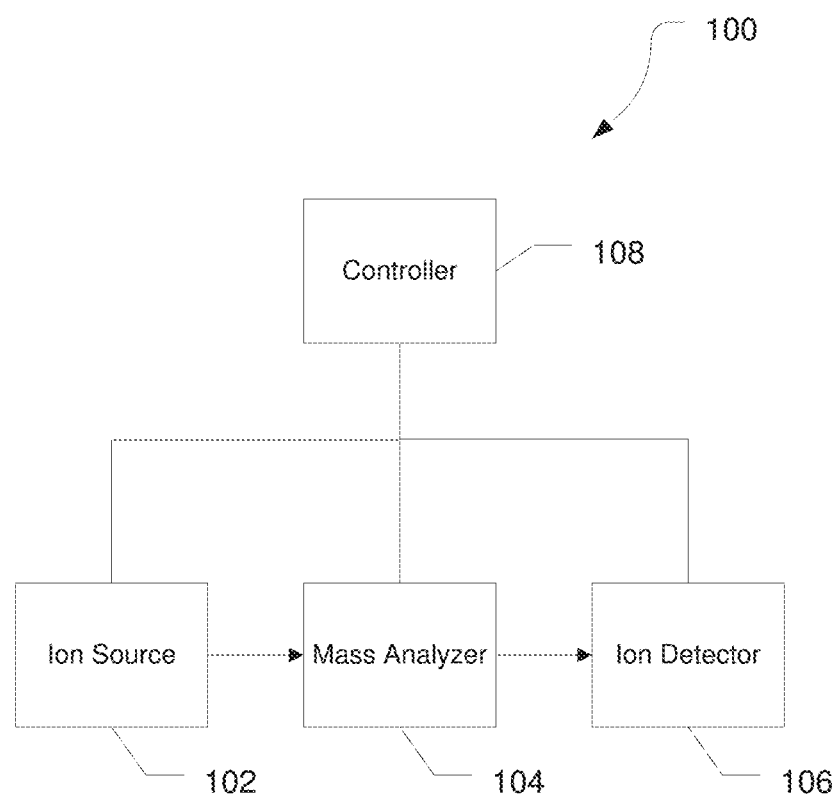
FIG. 1 is a block diagram of an exemplary mass spectrometry system, in accordance with various embodiments.

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

Low Pressure Ion Mobility Separation

Figure 2:
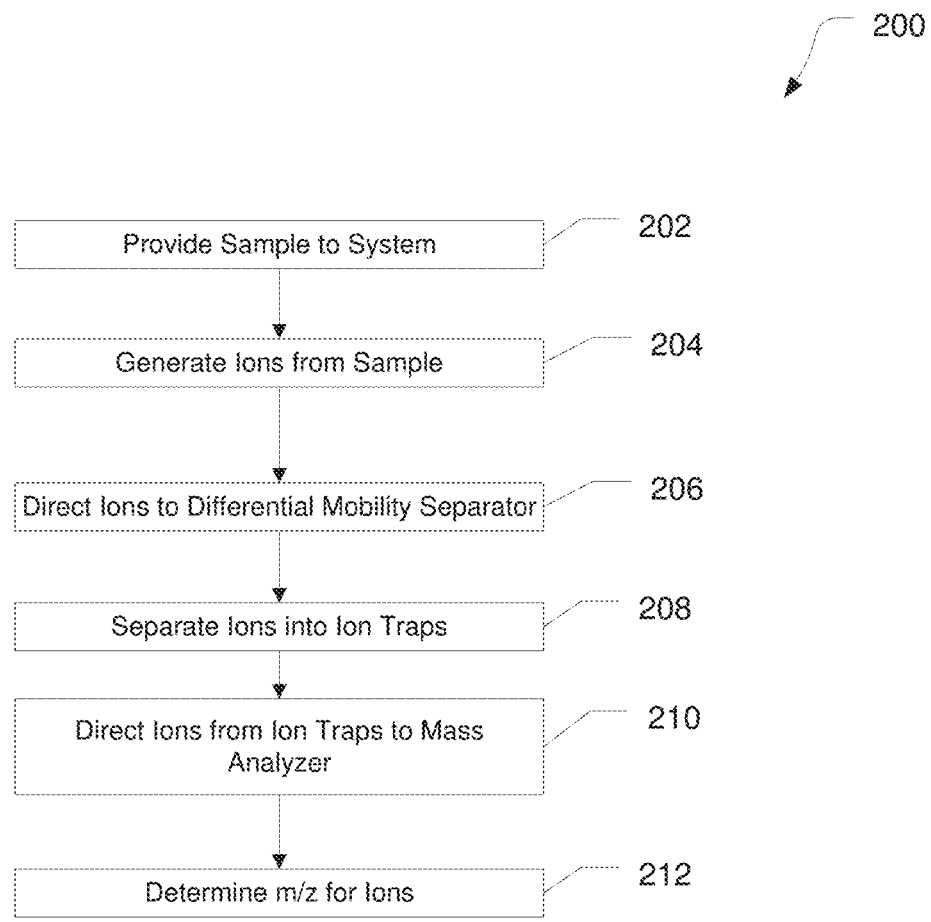
FIG. 2 is a flow diagram of an exemplary method for separating ions, in accordance with various embodiments.

FIG. 2 is a flow diagram illustrating an exemplary method 200 of separating ions according to their mobility in order to increase the efficiency of a mass spectrometry platform, such as mass spectrometry platform 100 in FIG. 1.

At 202, a sample can be provided to a system. In various embodiments, the sample can be effluent from a liquid chromatography column, effluent from a gas chromatography column, a directly injected sample (liquid or gas), or a sample embedded in a solid matrix.

At 204, they system can generate ions from the sample. The sample can enter into an ion source to generate ions. The ion source can utilize various energy sources, such as electrical, light, plasma, chemical, electrons, heat, or the like to ionize the sample or components of the sample.

At 206, the ions can move from the source into a mobility separator. In various embodiments, the mobility separator can include a flow of gas in a first direction and an electrical field in a second direction. In various embodiments, the ions can move with a substantially similar velocity in the first direction due to the flow of the gas. However, the velocity in the second direction can be affected by collisions with the gas ions, and thus larger ions (with a greater collisional cross section) will move more slowly in the second direction, resulting in a separation of the ions along the first direction being a function of transit time in the second direction. That is, larger ions that move more slowly in the second direction will move further in the first direction in the time it takes for them to traverse the mobility separator in the second direction, while smaller ions will move faster across the mobility separator, and thus the distance traveled will be smaller. In this way, ions entering an ion channel can have a different range on ion mobilities to ions entering an adjacent ion channel.

At 208, the ions can be separated and delivered into a plurality of ion channels arranged along the first direction of the mobility separator. Smaller ions can enter an ion channel located a smaller distance along the first direction relative to the ion entrance, while larger ions can enter an ion channel located a larger distance along the first direction relative to the ion entrance. As ions enter the mobility separator, the can be accumulated in the ion channels based on their ion mobility.

In various embodiments, the ion channels can include ion traps, RF ion guides, DC ion lenses, or a combination thereof. In particular embodiments, the ion channels can include ion traps each defined by a plurality of rods. Additionally, each ion trap can include one or more drag vanes. In certain embodiments, adjacent ion traps in the array of ion traps can share a pair of rods.

At 210, ions can be ejected from one of the ion channels/traps and sent to a mass analyzer. In alternate embodiments, the ions may undergo other processes prior to reaching the mass analyzer, such as separations based on mass-to-charge ratio, fragmentations, or the like. In various embodiments, the ions of other mobility can continue to be accumulated in their respective traps. Additionally, the ions can be sequentially ejected from a plurality of the ion channels/traps, so that the ions can be analyzed.

At 212, the mass analyzer can determine the mass-to-charge ratio of the ions, or the fragments of the ions if the ions undergo fragmentation prior to the mass analyzer.

Figure 3:
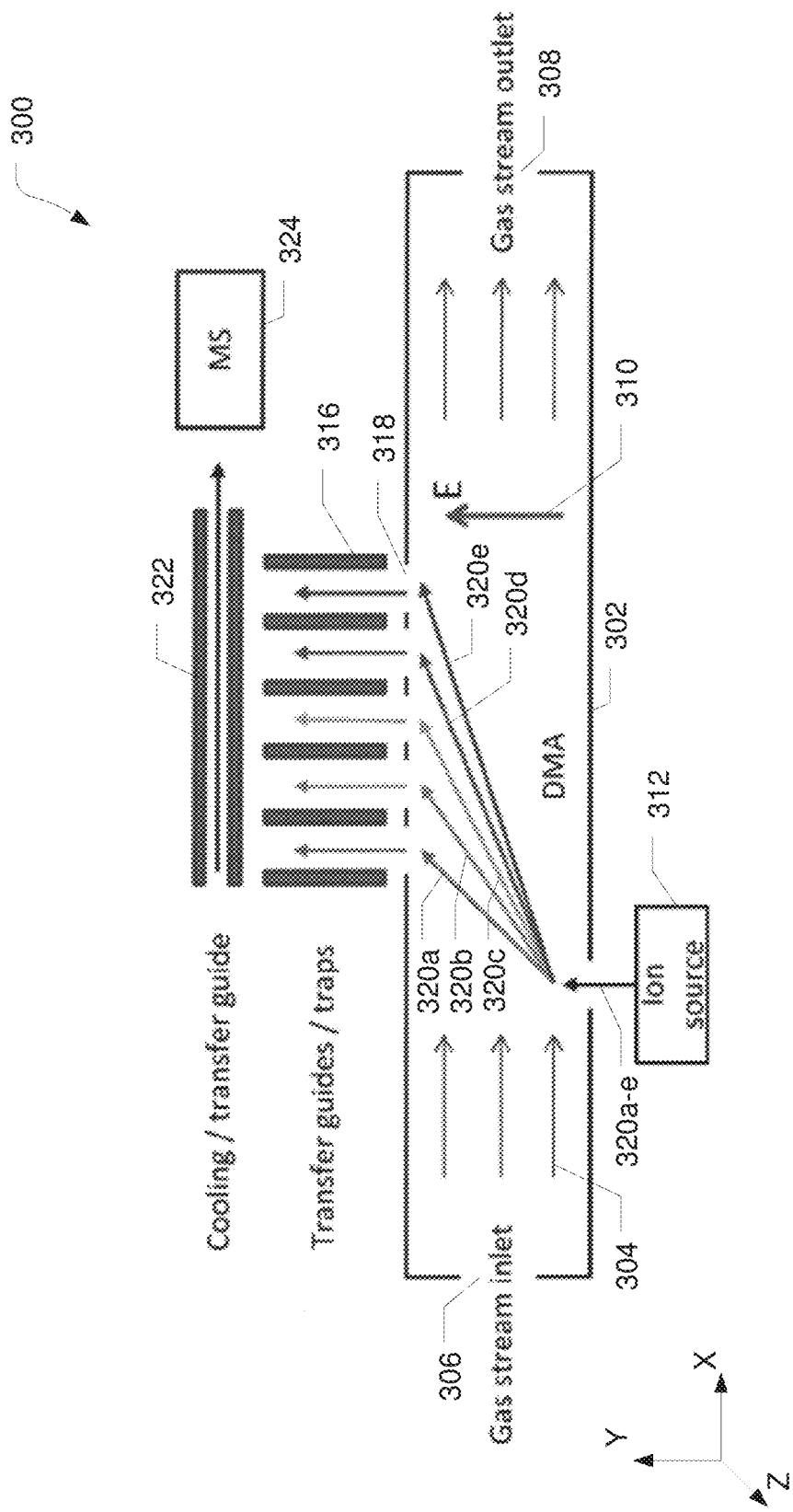
FIG. 3 is a block diagram illustrating an exemplary ion mobility separator, in accordance with various embodiments.

FIG. 3 is a block diagram illustrating a mobility separator 300. The mobility separator 300 can include a mobility cell 302 consisting of a region, such as a substantially rectangular region, with a gas flow 304 moving in a first direction from a gas inlet 306 at one end to a gas outlet 308 at the opposite end. Additionally, an electrical field gradient 310 can be applied in a second direction. In various embodiments, the first direction and the second direction can form an angle of between about 45° and 180°, such as between about 70° and about 150°. In particular embodiments, the first direction and the second direction can be orthogonal (at right angles, perpendicular) to one another.

In various embodiments, a gas pressure within the mobility cell 302 can be between about 1 Torr and about 20 Torr, such as between about 3 Torr and about 6 Torr. In various embodiments, the gas flow can be between about 5 slm and about 50 slm. In various embodiments, the average gas velocity within the mobility analyzer cell 302 can be between about 50 m/s and about 250 m/s, such as between about 100 m/s and about 200 m/s.

An ion source 312 can be located proximal to an ion entrance 314 and an array of ion channels 316 can be located proximal to an array of ion exit orifices 318. The ion exit orifices 318 can be located opposite the ion entrance 314 in the second direction, and can be offset from the ion entrance 314 and spaced apart from one another in the first direction. Ions 320a through 320e entering the mobility cell 302 from the ion source 312 can be separated into the ion exit orifices 318 and directed into the array of ion channels 316 in accordance with their ion mobility within the mobility cell 302. In various embodiments, the ions 320a through 320e can flow at a substantially the same velocity along the first direction and may move in the second direction according to their collisional cross section. Thus, ions 320e with a larger collisional cross section can move more slowly in the second direction due to a larger number of collisions with the molecules in the gas flow relative to ions with a smaller collisional cross section 320a. Due to the slower movement in the second direction, ions 320e can move further along the first direction during their transit across the mobility cell 302. In this way, ions with successively larger collisional cross section can be sorted into the array of ion channels 316, such that ions in an ion channel have a different range of ion mobilities from ions in an adjacent ion channel.

In various embodiments, a lens array (not shown) can be positioned between the ion exit orifices 318 and the ion channels 316. The lens array can be configured to guide ions into the respective channel, such as by focusing the ions towards the centerline of the channel.

In various embodiments, the plurality of ion channels 316 can include between about 3 ion channels and about 50 ion channels, such as between about 5 ion channels and about 20 ion channels, even between about 7 ion channels and about 15 ions traps.

A cooling/transfer guide 322 can be located adjacent to the plurality of ion channels 316. Ions can be ejected from one of the ion channels 316 into the cooling/transfer guide 322. From the cooling/transfer guide 322, the ions can be directed to a mass analyzer 324. In various embodiments, the ions may be directed to other processes, such as a fragmentation cell (not shown), prior to the mass analyzer.

In various embodiments, the mobility separator system 300 can separate ions spatially to allow only one or a few types of ions to be directed to the mass analyzer at a time while capturing multiple groups of ions that can be stored in traps and subsequently injected into the mass analyzer. The ejections from the ion channels 316 can allow the mass analyzer to perform mass analysis of an ion packet while other ions continue to be accumulated and stored in the ion traps 316. The potential gain provided by the mobility separator can be equal to the number of separate channels.

Figure 4:
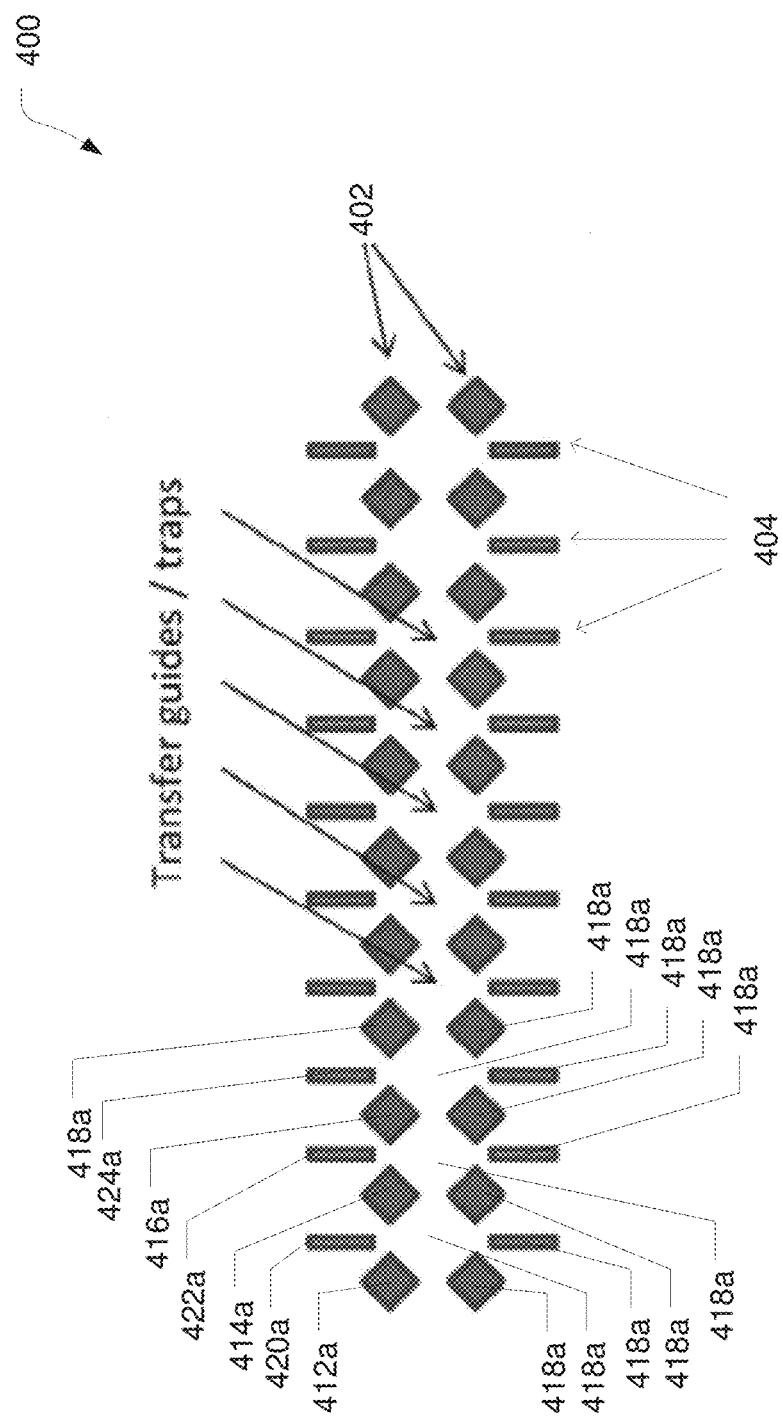
FIG. 4 is a block diagram illustrating an exemplary array of ion channels, in accordance with various embodiments.

FIG. 4 is a block diagram illustrating an exemplary array of ion channels 400, such as the array of ion channels 316 in FIG. 3. In various embodiments, the array of ion channels 400 can include an array of quadrupole rod pairs 402 and an array of drag vane pairs 404. Each ion channel, such as ion channels 406, 408, and 410, can be defined by 4 quadrupole rods (2 pairs). For example, ion channel 406 is defined by quadrupole rods 412a, 412b, 414a, and 414b, ion channel 408 is defined by quadrupole rods 414a, 414b, 416a, and 416b, and ion channel 410 is defined by quadrupole rods 416a, 416b, 418a, and 418b. Additionally, adjacent ion channels can share a quadrupole rod pair between them, for example, ion channels 406 and 408 share quadrupole rods 414a and 414b, and ion channels 408 and 410 share qua-drupole rods 416a and 416b. The quadrupole rods can create a quadrupolar field in each ion channel to confine ions within the channel.

Additional stopping DC voltages can be applied to the optical element before and after the set of quadrupole rods to trap ions inside the channels which in this case operate as ion traps. When needed, these voltages can be lowered quickly to release ions from the channels.

Additionally, in order to ensure quick release ions only from specific channels, each ion channel can include a corresponding pair of drag vanes. For example, ion channel 406 can have include drag vanes 420a and 420b, ion channel 408 can have include drag vanes 422a and 422b, and ion channel 410 can have include drag vanes 424a and 424b. By placing a DC gradient along a pair of drag vanes, ions can be driven out of the channel, such as into the cooling/transfer guide 322 of FIG. 3. Additional, as each ion channel has a unique pair of drag vanes, ions can be driven from one ion channel without driving ions from an adjacent ion channel.

FIGS. 5A through 5C show electrode arrangements for establishing the electric field gradient along the second direction of the mobility cell, such as mobility cell 302 in FIG. 3. FIG. 5A illustrates the use of a set of discrete electrodes (502a through 502h) on the walls of the mobility analyzer cell. The discrete electrodes can have increasing DC potentials going from $V_0$ proximal to the ion entrance to $V_N$ proximal to the ion exit. Additionally, in various embodiments, the discrete electrodes can be configured to establish a non-uniform electric field gradient, such that the electric field gradient systematically varies. Such an electric field gradient can partially confine and focus ions towards the centerline to compensate for diffusion broadening.

FIG. 5B illustrates the use of a resistive layer 504 to generate a continuous potential distribution from $V_0$ proximal to the ion entrance to $V_N$ proximal to the ion exit. Resistive layer 504 can be used to establish a substantially uniform electric field gradient.

FIG. 5C illustrates a set of discrete electrodes (506a through 506h) on the walls of the mobility cell, with the discrete electrodes configured with alternating RF potentials to confine ions towards the center and increasing DC potentials going from $V_0$ proximal to the ion entrance to $V_N$ proximal to the ion exit.

FIG. 6A illustrates an alternative approach to generating DC field inside mobility cell 600. In this case, the side panels can be made of insulating PCB material while contacts (pads) 602 can be formed by metal deposition. In various embodiments, the contacts can be rectangular or have other regular polyhedron that can form a tessellation of the space, such as hexagonal. Contacts can be addressed individually from the opposite side of the PCB providing separate DC voltages for each contact. By independently controlling the DC voltages for each contact, a variety of field distributions can be constructed. Additionally, the field distribution can be changed dynamically without changes to the hardware.

FIG. 6B illustrates an exemplary field distribution that can be approximated by applying voltages to metal pads is shown in FIG. 6A. This configuration can create a variable angle of field gradients inside the device as indicated arrows 620a through 620h. Target ions that travel from the inlet 622 to one of the outlets 624a through 624i can generally stay within the region between arrows 626 and 628. Within the region, the ions can pass through a range of angles between the field gradient and the gas flow, such as ranging from about 180° near the inlet 622 to about 90° near the outlets 624a through 624i. Having angle larger than 90° can increase the ion residence in the DMA cell and can improve the separation efficiency. Additionally, the entire exit plane can be at one DC potential so no segmentation of the exit plane is required. All exit ion guides can be at the same potential as well so handling of ions coming from different channels into the mass spectrometer can be simplified.

In various embodiments, the field distribution of FIG. 6B can be produced by other electrode arrangements, such as a series of curved electrodes with a layout roughly corresponding to the field lines shown in the FIG. 6B. Such an arrangement may have fewer voltages to control, and may even be constructed using resistive coupling of the electrodes such that only one voltage controller is required rather than a large number of independently controlled electrodes as in the case of the grid. However, such an arrangement would be fairly static in configuration with less customization and adjustment than would be available using the independently controllable contacts shown in FIG. 6A.

Figure 7A:
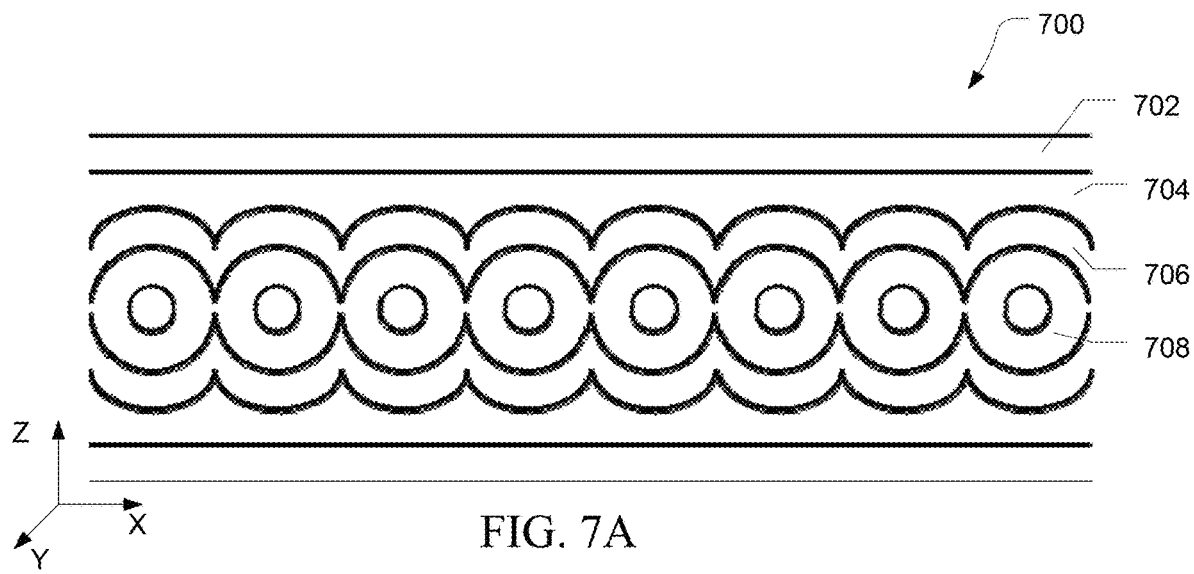
Figure 7B:
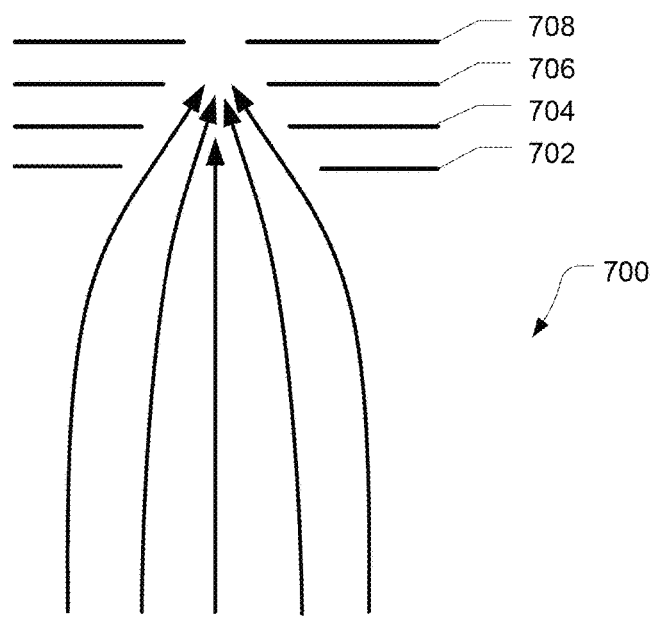

FIGS. 7A and 7B show an ion optical arrangements for focusing ions into the exit orifices of the ion mobility separator. A set of electrodes with diminishing dimensions can be provided ending with the final electrode containing the orifice. The stepped surface can be designed to be as smooth as possible to provide minimal impact on the gas dynamics. FIG. 7A shows an exemplary electrode geometry as seen from the direction of the ion motion. Electrodes 702, 704, 706, and 708 can have openings with decreasing size from the outermost elect 702 to innermost electrode 708. FIG. 7B shows the electrodes from a different angle and illustrates the ion path. Voltages applied can be DC or RF or the combination thereof which can both focus the ions toward the center line and provide a drag force to move them towards the exit hole. In particular embodiments, electrode 702 and 708 can carry DC only voltages and middle electrodes 704 and 706 can have RF potentials of alternating polarity. This arrangement can be particularly efficient in avoiding losses at the ion exit, thereby increasing ion transmission.

Figure 7C:
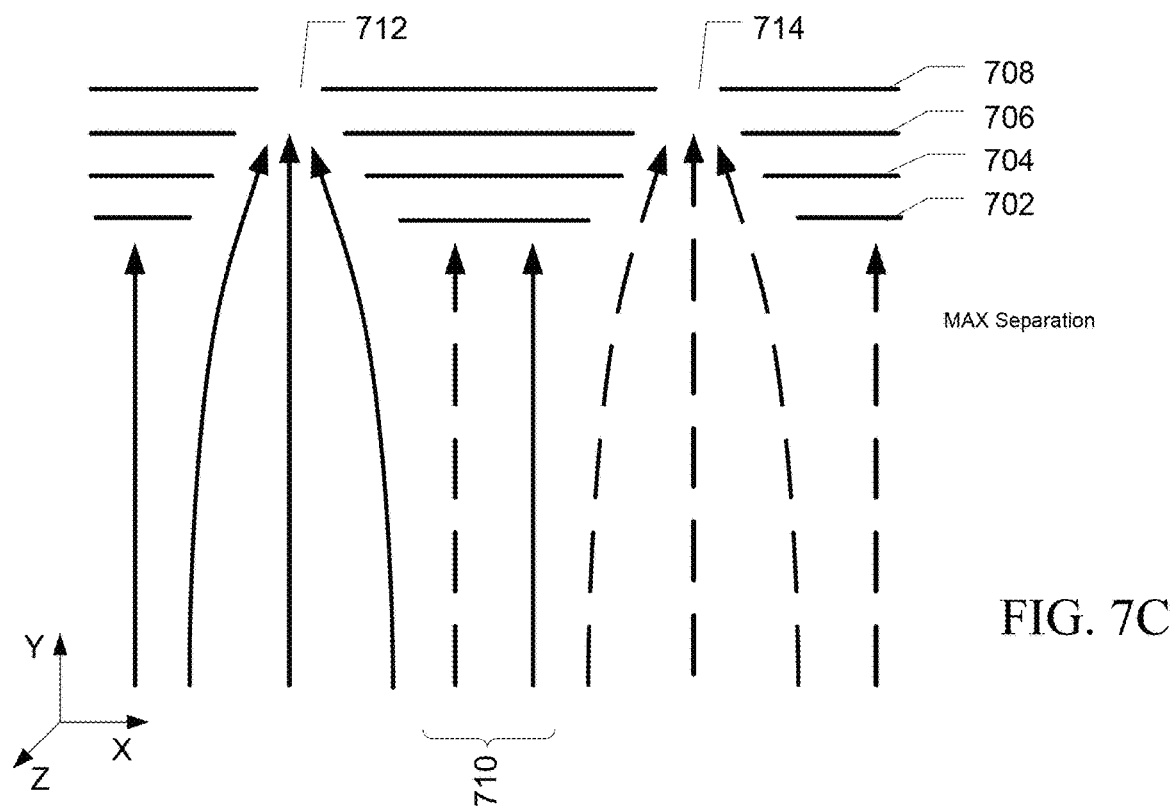
Figure 7D:
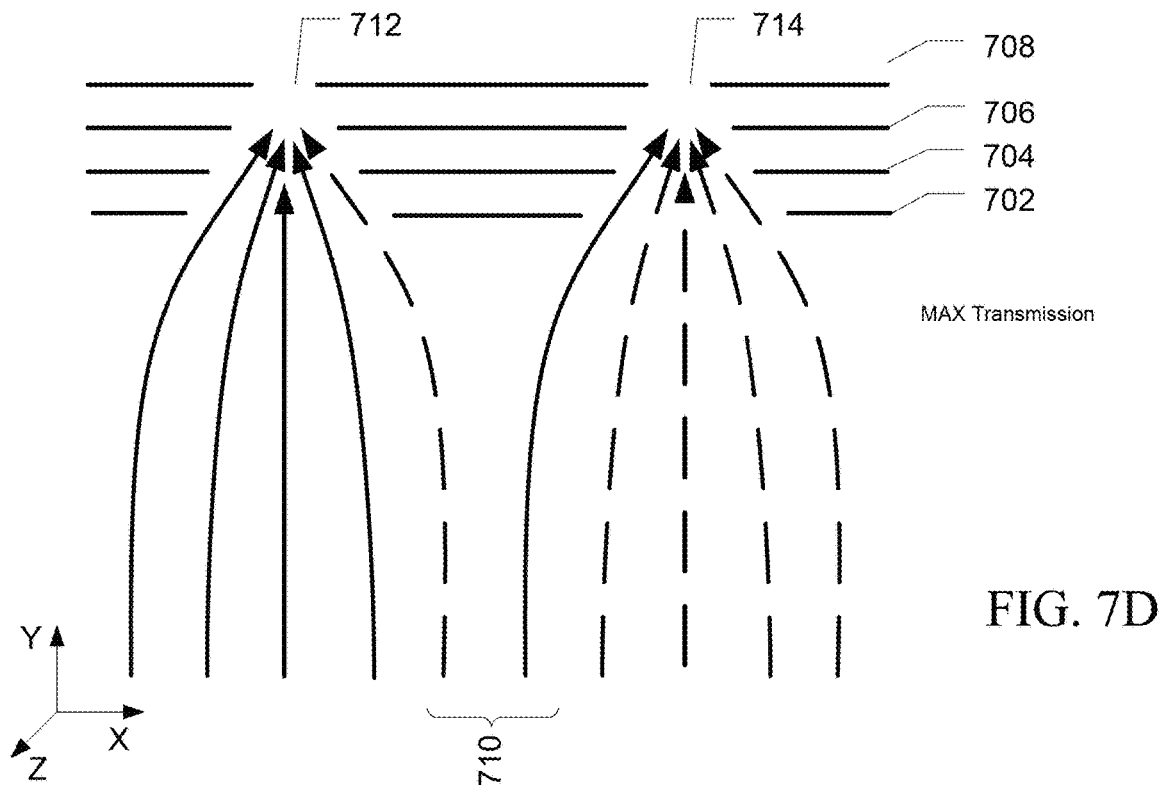

FIGS. 7C and 7D show various configurations of the ion optical arrangement of FIGS. 7A and 7B. The region 710 between the exit orifices 712 and 714 may have overlap in the range of ion mobilities. That is region 710 may include ions with ion mobilities corresponding to the range of ion mobilities targeted to exit orifice 712 and ions with mobilities corresponding to the range of ion mobilities targeted to exit orifice 714.

In FIG. 7C, the ion optical arrangement can be configured to maximize separation between the ions exiting adjacent exit orifices. By reducing the focusing, the ions in the region of overlapping ion mobilities can be excluded from exit orifice 712 and 714, minimizing the ions exiting the exit orifice 712 that correspond to the ion mobility range of exit orifice 714 and the ions exiting exit orifice 714 that correspond to the ion mobility range of exit orifice 712.

In FIG. 7D, the ion optical arrangement can be configured to maximize ion transmission. By increasing the focusing, the ions in the region of overlapping ion mobilities can be directed to one of exit orifice 712 or 714, minimizing the ions lost to collisions with electrode 702. However, there this configuration may increase the number of ions exiting the exit orifice 712 that are outside the range of ion mobilities targeted to exit orifice 712 the number of ions exiting the exit orifice 714 that are outside the range of ion mobilities targeted to exit orifice 714.

FIG. 8 illustrates a method 800 of separating ions according to their mobility in order to increase the efficiency of a mass spectrometry platform, such as mass spectrometry platform 100 in FIG. 1. At 802, a sample can be provided to a system. In various embodiments, the sample can be effluent from a liquid chromatography column, effluent from a gas chromatography column, a directly injected sample (liquid or gas), or a sample embedded in a solid matrix.

At 804, they system can generate ions from the sample. The sample can enter into an ion source to generate ions. The ion source can utilize various energy sources, such as electrical, light, plasma, chemical, electrons, heat, or the like to ionize the sample or components of the sample.

At 806, the ions can move from the source into a mobility separator. In various embodiments, the mobility separator can include a flow of gas in a first direction and an electrical field in a second direction. In various embodiments, the ions can move with a substantially similar velocity in the first direction due to the flow of the gas. However, the velocity in the second direction can be affected by collisions with the gas ions, and thus larger ions (with a greater collisional cross section) will move more slowly in the second direction, resulting in a separation of the ions along the first direction being a function of transit time in the second direction. That is, larger ions that move more slowly in the second direction will move further in the first direction in the time it takes for them to traverse the mobility separator in the second direction, while smaller ions will move faster across the mobility separator, and thus the distance traveled will be smaller. In this way, ions entering an ion channel can have a different range on ion mobilities to ions entering an adjacent ion channel.

At 808, the ions can be separated and delivered into a plurality of ion channels arranged along the first direction of the mobility separator. Smaller ions can enter an ion channel located a smaller distance along the first direction relative to the ion entrance, while larger ions can enter an ion channel located a larger distance along the first direction relative to the ion entrance. As ions enter the mobility separator, the can be accumulated in the ion channels based on their ion mobility.

At 810, ions can be ejected from one of the ion channels/traps and sent to a mass analyzer. In alternate embodiments, the ions may undergo other processes prior to reaching the mass analyzer, such as separations based on mass-to-charge ratio, fragmentations, or the like. In various embodiments, the ions of other mobility can continue to be accumulated in their respective traps. Additionally, the ions can be sequentially ejected from a plurality of the ion channels/traps, so that the ions can be analyzed.

At 812, operating parameters of the mobility separator can be changed. In various embodiments, the voltages and/or arrangement of the field gradient can be altered by changing the voltages on the gradient electrodes or contact pads. This can increase or decrease the dwell time in the separator altering the range of ion mobilities that are targeted to each exit orifice. In other embodiments, the voltages of the ion optics at the exit orifices can be changed to increase separation or increase transmission. In some cases, both may be changed simultaneously. After the parameters are changed, additional ions can be directed to the mobility separator, as indicated at 806.

At 814, the mass analyzer can determine the mass-to-charge ratio of the ions, or the fragments of the ions if the ions undergo fragmentation prior to the mass analyzer.

In various embodiments, the voltages or voltage patterns of the ion mobility separator can be changed dynamically during a chromatographic separation. For example, the mobility separator can be configured to a narrow range of ion mobilities for one chromatographic region (retention time range) and a broad range of ion mobilities for a second chromatographic region. In another example, the ion mobility separator can alternate between a narrow range of ion mobilities at a first mass range and a broad range of ion mobilities at a second mass range within the same chromatographic region.

In various embodiments, a survey can be performed where a broad range of ion mobilities are separated in the mobility separator with the ion optics configured to maximize separation. Upon detecting ions of interest, the mobility separator can be reconfigured to narrow the range of ion mobilities to obtain more detailed analysis of ions within the region. A corresponding change to increase the transmission of ions through the ion optics may be desirable as the narrower range may contain fewer ions targeted to each ion exit and there may be fewer overlapping ions. Due to the timescale of the chromatographic separation and the time it takes to perform a survey, the instrument can be configured to perform the survey periodically during a chromatographic separation, switching to the more detailed analysis upon detecting the presence of a target ion or upon detection in an increase in ion intensity. The system can be configured to perform a more detailed analysis for specific list of target ions at specific retention times (data independent analysis) or when as ion species are detected (data dependent analysis).

FIGS. 9A and 9B illustrate configurations for bypassing the ion mobility separator. For example, tuning upstream and downstream elements of the mass spectrometer can be simplified when not utilizing the ion mobility separation. In FIG. 9A, ion mobility separator 902 can include an additional ion exit aperture 904 positioned across from the ion entrance 906. In various embodiments, the gas flow may be stopped and ions can cross the ion mobility separator 902 directly from ion entrance 906 to ion exit aperture 904.

In FIG. 9B, an alternate ion path 910 can be provided that completely bypasses the ion mobility separator 912. A branch point 914 can be located upstream of the ion mobility separator 912 and the alternate path 910 can rejoin the ion paths through the ion mobility separator 912 at a downstream point 916.

FIG. 10 illustrates a mass spectrometry system 1000 for quantifying components of a sample. Mass spectrometry system 1000 can include an ion inlet 1002, an ion mobility separator 1004, transfer guides/traps 1006A through 1006H, a collector guide 1008, and a mass analyzer 1010.

The ion inlet 1002 can receive ions, such as from an ion source, for example ion source 102 of FIG. 1 or ion source 312 of FIG. 3. Collector guide 1008 can be similar to cooling/transfer guide 322 of FIG. 3. Collector guide 1008 can be located adjacent to the transfer guides/traps 1006A through 1006H. Ions can be ejected from one of the transfer guides/traps 1006A through 1006H into the collector guide 1008. From the Collector guide 1008, the ions can be directed to a mass analyzer 1010. In various embodiments, the ions may be directed to other processes, such as a fragmentation cell (not shown), prior to the mass analyzer 1010.

In various embodiments, the ion mobility separator 1004 can separate ions based on their ion mobility as previously described. By altering the gas flow or the electric field, a set of target ions can be guided into the transfer guide/traps, such as transfer guides/traps 1006B, 1006E, and 1006G. Due to the separation of ion mobility separator 1004, each transfer guide/trap would accumulate different target ions from the other transfer guide/traps. Additionally, the transfer guides/traps can be individually accessible, such that, for example, ions from transfer guide/trap 1006B could be ejected into 1008 for analysis while transfer guide/trap 1006E is accumulating ions and transfer guide/trap 1006G is holding ions to be analyzed after the ions within transfer guide/trap 1006B.

During a sample analysis, it can be necessary to monitor multiple parent ions at a time. Typically, compounds can be separated using chromatography, such as ion chromatography or gas chromatography, or other separation technique. However, during a complex separation, the elution of two or more compounds can overlap. Each compound can give rise to one or more ions, and during an elution window, multiple target ions may be monitored simultaneously to detect, identify, and quantify one or more compounds of interest.

In various embodiments, the list of co-eluting compounds can analyzed and subdivided into multiple groups based on similarity of their mobility so that ions from one group are collected in the same transfer guide/trap. During a first acquisition cycle, ions from each group can be transferred to the collector guide 1008. One ion species can be selected, such as by using a quadrupole mass filter. The ion species can be the fragmented and detected. In subsequent acquisition cycles additional ions from each group can be targeted.

FIG. 11A illustrates the analysis sequence for a plurality of ions in a retention time window. During a first acquisition cycles, ions can be analyzed from each of the 10 channels (Ion Set #1). During a second acquisition cycle, an additional ion from each channel containing more than one ion species of interest can be analyzed (Ion Set #2). Since channels 3, 5, and 8 only contain one ion species of interest, channels 3, 5, and 8 can be skipped during the second acquisition cycle. Similarly, during a third acquisition cycle, ion set #3 contains ions from only a few channels (1, 6, and 9) may need to be analyzed. The overall gain in throughput can be calculated to be about 20/3=6.6x (ratio between number of ions analyzed and number of runs).

In various embodiments, it may be desirable to move the ions in channels 3, 5, and 8 to Ion Set #3 to even out the number of ions in each set and the duration of each acquisition cycle, as illustrated in FIG. 11B.

FIG. 11C illustrates an analysis sequence for a plurality of ions in a retention time window where multiple fragment ions for some target ions may be monitored. During a first acquisition cycles, ions can be analyzed from each of the 10 channels (Ion Set #1). During a second acquisition cycle, channel 8 can be skipped since there is only one fragment for the only target ion in that channel. Channels 2 and 9 can proceed to analyzing a second target ion since the first target ion only has one fragment of interest. The first target ion can be selected from the remaining channels to analyze a second fragment of interest. During remaining acquisition cycles (Ion sets #3, #4, and #5) additional target ions with additional fragments of interest can be analyzed until all the fragments of interest for all the target ions from all the channels have been analyzed.

The timing for each channel can include an accumulation period where ions can be accumulated in a channel, a transfer period where ions are transferred from channel to for analysis, and an acquisition period. The accumulation period Tacc can be when ions are transferred from the differential mobility cell into trapping regions through transfer ions guides. The range of acceptable values of Tacc can be limited on the top end by the space charge capacity of the trapping regions. In various embodiments, the accumulation time can be not longer than about 500 hundred milliseconds, such as up to about 100 ms.

During the transfer period Ttr, the content of a trap is released from them and transferred into the collector ion guide and subsequently into a mass spectrometer. In various embodiments, transfer time Ttr can be under 1 ms. However, the transfer time may depend on the type of mass analyzer.

The acquisition period Tdet can include the time during which the ion packet is sent to the mass analyzer and detected. Depending on the mass spectrometer type the analysis can take from 1 ms (triple quadrupoles, TOF) up to tens or hundreds of milliseconds (linear traps, orbitrap). The width of the ion pulse in time domain can affect the minimum acquisition time which is likely around 1 ms. If the ratio of accumulation time over analysis time is high (100 or higher), this can adversely affect the dynamic range due to detector limitations or analyzer trap capacity (if present). While the analysis is performed, the accumulation in traps can continue in parallel so no duty cycle loss occurs.

The optimum timing can be achieved by tailoring $T_{acc}$ to the sum of $T_{tr}+T_{det}$ for all channels. For example, for an ion trap analyzer $T_{tr}+T_{det}$ can be as fast as 5 ms. Then the full acquisition cycle for 10 channels can be 50 ms, which is low enough to avoid space charge losses. For a triple quadrupole MS the analysis can be shorter so the full cycle can be as short as 20 ms or less.

The timing of ion transfer from the trapping guides into the collector guide and ultimately to the mass spectrometer can be controlled by a variety of gate-like elements. Typically, once a gate is open, the transfer of ions can accomplished by applying a voltage or a set of voltages that actively move ions towards the destination. This voltage (field gradient) can be necessary to transfer ions within a certain amount of time and to achieve the required analysis speed.

In other cases, too quick of an ion pulse can be a problem for a beam type analyzers such as a triple quadrupole. If a large collection of ions is compressed to a pulse less than 1 ms long, then the detector can be saturated easily. This issue can be overcome by at least two following methods. First, Tacc can be reduced to a minimum (about 2 ms per channel) which reduces ion population but can affect the duty cycle somewhat due to the settling time within the analyzer which can be as high as 1 ms. Second, the release of ions from the trapping guides can be slowed down by slow opening of the gates and using space charge effects to push ions forward. This way the ion pulses can be made wider.

FIG. 12 illustrates an exemplary method 1200 for analyzing a sample. At 1202, the mobility of the target analytes can be calibrated to identify the channel into which the target analyte would be directed. In various embodiments, the calibration can be accomplished experimentally by running a sample or standard containing the target analyte to identify the channel or to determine how changes in the ion mobility separator parameters, such as gas flow and electric field, affect which channel ions from the target analyte enter. In alternative embodiments, the channel can be determined computationally, either through modeling or accessing a library of previously determined relationships.

At 1204, retention time windows with minimum overlap can be identified. If various embodiments, it can be desirable to minimize the number of different ion species with similar mobility that end up in a common channel. When an analyte partially overlaps another species with similar mobility in the chromatographic separation, it can be desirable to analyze the ions of the analyte in a region of the chromatographic peak other than the overlap region. By chromatographically excluding the interfering species, more of the target analyte ions can be accumulated in the channel without exceeding the channel capacity. Additionally, by chromatographically separating two target analytes with similar mobilities, it can be possible to reduce the number of ion sets and acquisition cycles for a retention time window.

At 1206, mobility separation parameters can be adjusted for specific retention time windows. The gas flow, electric field, or a combination thereof can be adjusted to alter the range of ion mobilities selected by the channels. For example, when a broader range of ion mobilities for the target ions is in a retention time window, it can be necessary to expand the range of ion mobilities to capture all the target ions. Alternatively, when there is a narrow range of ion mobilities for the target ions in a retention time window, it can be desirable to reduce the range of ion mobilities to separate the target ions into different channels. Additionally, adjustments to the parameters may be necessary to move the range up or down to capture the target ions.

At 1208, a number of ion sets for each retention time window can be determine. The number of ion sets can be calculated from the number of different target ions captured in a channel and the number of target fragments for the ions captured in a channel.

At 1210, an optimum accumulation time can be determined. In various embodiments, the optimum accumulation time can be selected to avoid over filing a channel or to avoid saturation of the ion detector. For example, a shorter accumulation time can be chosen when there is a higher ion flux or a longer accumulation time can be chosen when there is a lower ion flux. In various embodiments, the optimum accumulation time can also be a function of the number of channels involved in an acquisition cycle as well as the duration of the transfer period and the acquisition time. The accumulation time can be chosen to be long enough to accommodate the transfer and acquisition for all involved ion channels in an acquisition cycle. As such, a later acquisition cycle with fewer ions in the ion set can accommodate a shorter accumulation time than an acquisition cycle with more ions in the ion set.

In various embodiments, it may be desirable to determine an optimal sequencing of the ion sets. For example, ions from channels involved in a small number of ion sets can be moved to later less populated ion sets to result in a more even dispersion of ions across the sets. Alternatively, it may be desirable to have larger ion sets early and smaller ion sets later with a plan to utilize different accumulation times for different acquisition cycles.

At 1212, the analysis can be performed on the sample. For example, the sample can be chromatically separated and during each of the retention time windows (determined in 1204), the ion mobility separation parameters can be set (as determined in 1206) and a sequence of acquisition cycles can be performed (determined in 1208 and 1210) and the compounds of the sample can be analyzed, identified, and quantified.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for analyzing a sample comprising:
a source configured to generate ions from constituent components of the sample;
a mobility separator configured to separate ions received from the source based on the mobility in a gas;
a plurality of ion channels arranged adjacent to the plurality of exit apertures of the mobility separator such that ions from the mobility separator are directed to different channels according to their respective mobility;
a mass analyzer configured to determine the mass-to-charge ratio of the ions; and
a controller configured to:
identify retention time windows with minimum overlap of ions with similar mobility that would at least partially be directed to a same ion channel and sets of ions within the retention time windows;
adjust mobility separation parameters for at least one set of the sets of ions within the retention time windows to adjust the range of ion mobilities directed to the ion channels; and
quantify a plurality of target analytes.

2. The system of claim 1 wherein the controller is further configured to select an optimum accumulation times based on a population of sets of ions for a retention time window.

3. The system of claim 1 wherein the controller is further configured calibrate the mobility of a plurality of the target analytes.

4. The system of claim 1 further comprising a lens array positioned between the mobility separator and the plurality of ion channels, the lens array configured to guide ions into respective ion channels.

5. The system of claim 1, wherein the controller is configured to determine a number of sets of ions based on a number of overlapping compounds.

6. The system of claim 1, wherein the controller is further configured to determine a number of sets of ions based on a number of overlapping compounds and a number of different products.

7. The system of claim 1, wherein the mobility separator includes a first wall, a second wall, a passage between the first and second wall, and having a gas flow in a first direction and an electric field such that ion paths of the ions from a ion entrance to a plurality of ion exit apertures are governed by the electric field and the gas flow.

8. The system of claim 7, wherein the controller is configured to adjust mobility separation parameters by adjusting a gas flow rate, adjusting the electric field, or any combination thereof.

9. The system of claim 1, wherein the controller is further configured to adjust a trapping time, an acquisition time, or a combination thereof to optimize sensitivity for at least some of the sets of ions within the retention time windows.

10. The system of claim 1, wherein a transmission of ions through the mobility separator for a first set of ions is greater than a transmission of ions through the mobility separator for a second set of ions.

11. The system of claim 1, wherein a separation of ions through the mobility separator for a first set of ions is greater than a separation of ions through the mobility separator for a second set of ions.

12. A method for analyzing components of a sample comprising:
identify retention time windows with minimum overlap of ions with similar mobility that would at least partially be directed to a same ion channel and sets of ions within the retention time windows;
determining mobility separation parameters for the sets of ions to direct a range of ion mobilities encompassing target ions within the set of ions into the ion channels;
providing a sample to an ion source and generating a plurality of ions from constituent components of the sample;
separating a first set of ions of the plurality of ions based on ion mobility using an ion mobility separator using parameters for the first set of ions;
directing the ions into a plurality of ion channels such that ions entering an individual ion channel have a range of ion mobilities that is different from a range of ion mobilities for ions entering an adjacent ion channel;
analyzing ions from the first set of ions from individual ion channels in a mass analyzer;
adjusting the ion mobility separator using parameters for a second set of ions;
separating a second set of ions of the plurality of ions based on ion mobility using the mobility separator;
directing the ions into the plurality of ion channels;
analyzing ions of the second set of ions from individual ion channels in the mass analyzer; and
determining the mass-to-charge ratio and quantifying ions of the first and second sets of ions using the mass analyzer.

13. The method of claim 12, wherein the first ion set is within a first retention time window and the second ion set is within a second retention time window.

14. The method of claim 12, wherein the first ion set and the second ion set is within a first retention time window.

15. The method of claim 12, further comprising selecting an optimum accumulation times for the retention time windows based on a population of sets of ions.

16. The method of claim 12, further comprising fragmenting the ions prior to analyzing in the mass analyzer.

17. The method of claim 12, further comprising calibrating the mobility of target analytes.

18. The method of claim 12, wherein separating ions using a ion mobility separator the ion mobility separator includes providing a gas flow in a first direction and an electric field such that ion paths of the ions from a ion entrance to a plurality of ion exit apertures are governed by the electric field and the gas flow.

19. The method of claim 16, wherein adjusting the ion mobility separator includes adjusting the gas flow, adjusting the electric field, or any combination thereof.

20. The method of claim 12, further comprising adjusting a trapping time and an acquisition sequence timing for the second set of ions.

21. The method of claim 12, wherein a transmission of the first set of ions is greater than a transmission of the second set of ions.

22. The method of claim 12, wherein a separation of the first set of ions is greater than a separation of the second set of ions.

* * * * *